Figure 1:
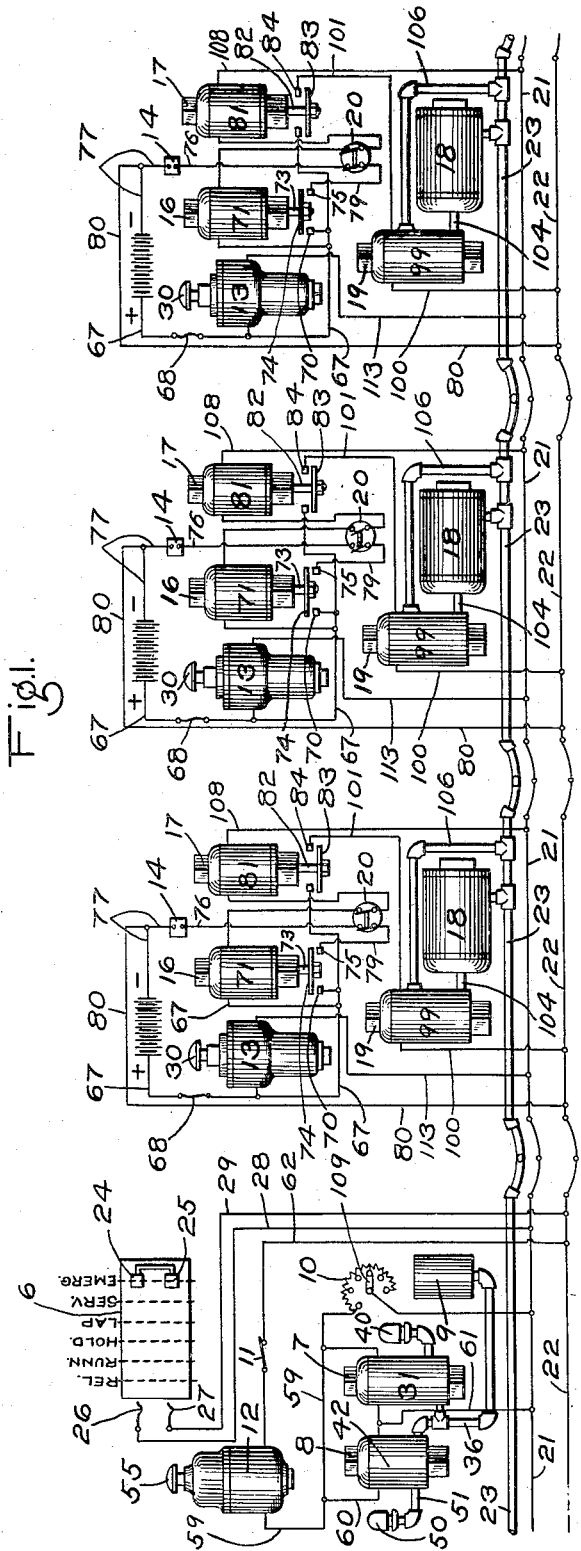

INVENTOR
JOSEPH C. McCUNE
BY Wm. M. Cady
ATTORNEY

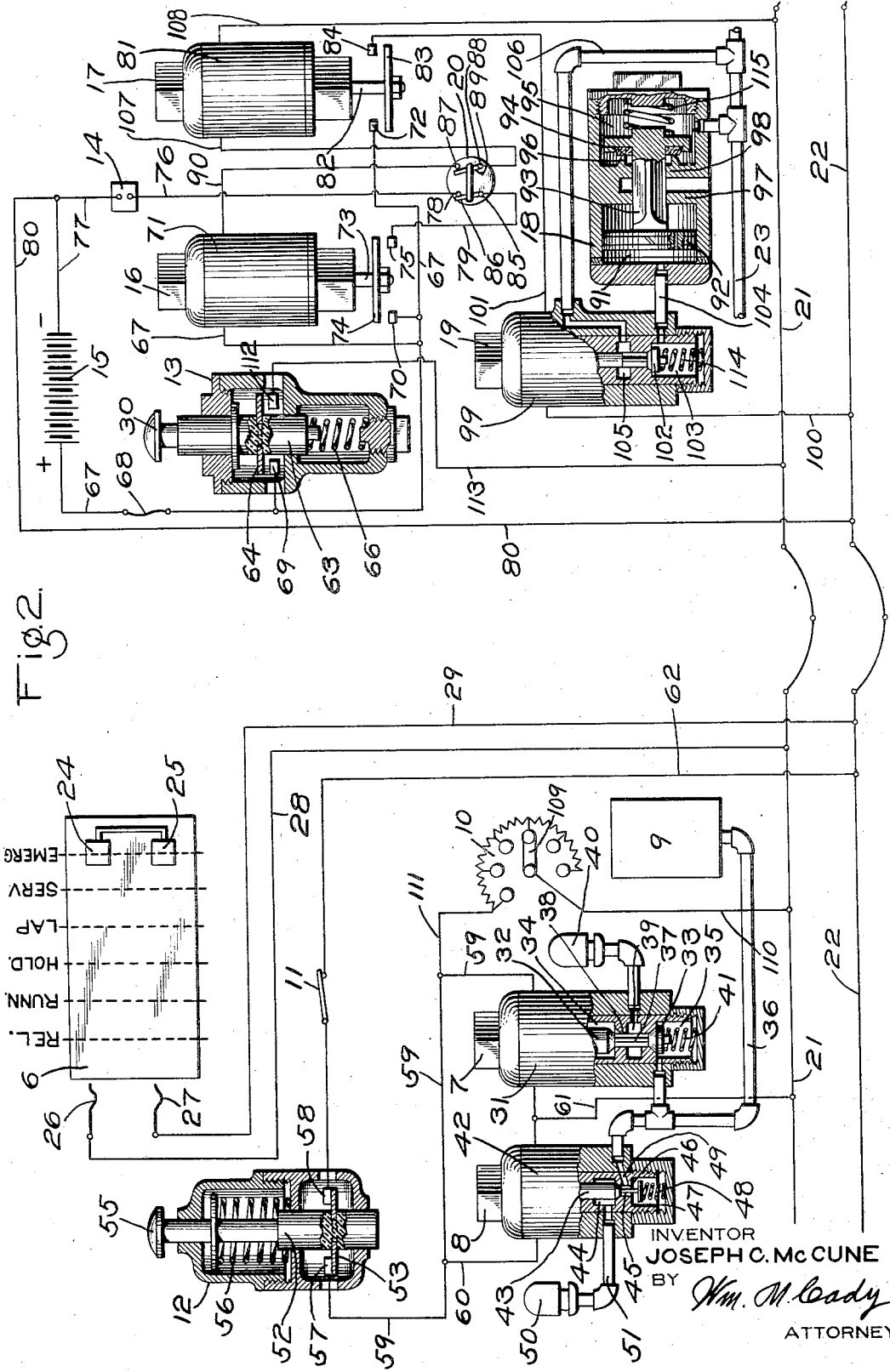

Patented July 25, 1933

1,919,441

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

ELECTRIC SIGNAL SYSTEM

Application filed June 4, 1929. Serial No. 368,219.

This invention relates to combined fluid pressure brake and electric signaling systems of the type especially adapted for use on railway trains composed of a steam locomotive and a plurality of cars.

An object of the invention is to provide a combined fluid pressure brake and electric signaling system in which the train signaling circuit is utilized for electrically effecting an emergency application of the brakes.

Another object of the invention is to provide a combined fluid pressure brake and electric signaling system which is operative for transmitting and receiving trainmen's signals and also operative for locally venting fluid under pressure from the brake pipe to the atmosphere when the brake valve device is operated to effect an application of the brakes.

Another object of the invention is to provide a combined fluid pressure brake and electric signaling system of the character specified in which the electrically controlled brake and signaling equipment on each car of the train is arranged in a closed circuit with the electrically controlled brake and signaling equipment on the locomotive.

Another object of the invention is to provide an electrically operated combined fluid pressure brake and signaling system of the above type in which the equipment on each car, as well as the equipment on the locomotive, is arranged in a closed circuit including two train line conductors, the electrical elements on the locomotive and also on the cars being normally maintained energized by current supplied from the usual storage batteries on the cars, and the locomotive equipment having means for detecting a break or short in the circuit.

Another object of the invention is to provide an electrically operated combined fluid pressure brake and signaling system of the above type, in which the equipment on each vehicle of the train is arranged in a closed circuit extending the length of the train, and in which the locomotive equipment is supplied with current from a source on each car of the train, means being included in the train circuit for limiting the quantity of current supplied to the locomotive equipment, irrespective of the number of cars of the train.

Another object of the invention is to reduce the cost of and simplify combined fluid pressure brake and signaling systems of the character mentioned by eliminating the installation of special power circuits. This is accomplished by taking advantage of the ordinary power circuits already installed on railway cars as a source of power for operating the system, thereby decreasing the initial cost of installation and the charges for maintaining the system in operation.

Another object of the invention is to provide an improved combined fluid pressure brake and signaling system of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings; Figure 1 is a diagrammatic view of a combined fluid pressure brake and signaling system embodying the invention, showing the same in connection with a locomotive and a plurality of cars, one of the car signal cut-out switches being shown open and the other cut-out switches being shown closed; and Fig. 2 is a diagrammatic view, partly in section, of a portion of the equipment illustrated in Fig. 1 shown on a larger scale.

When an electric signaling system is combined with electrically operated means for controlling the operation of the fluid pressure brakes of railway trains, what is known as a "closed circuit" system is preferred to an open-circuit system for the reason that in a system wherein the circuit is normally closed an accidental breaking or shorting of the circuit can be at once detected, as such a break or short in the circuit will cause the operation of a signal indicator or alarm in the same manner that a break in the circuit by the intentional operation of the signal key or switch will cause said indicator to be operated, whereas in the use of an open-circuit system the detection of an accidental break in the circuit is difficult, so that frequent examination or testing of the circuit is necessary to insure the proper operation of the apparatus.

According to the present invention, I provide a combined fluid pressure brake and electric signaling system for railway trains in which the electrically operated devices on each of the cars are connected in series to two train line conductors, while on the locomotive the equipment comprises a pair of electrically operated signal indicating devices which are connected in parallel with the train line conductors in such a manner that one device is adapted to indicate a break or short in the train line circuit, while the other device is adapted to indicate signals initiated on any of the cars of the train. The equipment on each of the cars comprises means for electrically operating the brake pipe vent valves, said means being controlled by the operation of the brake valve on the locomotive. Electric current is supplied to the car equipment and also to the locomotive equipment from the usual storage batteries on the cars and means are provided for preventing overloading of the locomotive equipment should the number of cars of the train exceed the maximum number for which the equipment is constructed. The equipment on each car comprises a plurality of electromagnet devices for controlling the operation of a plurality of switch devices. The magnet devices are so arranged in the train line circuit that current supplied from each car storage battery, when the car signal cut-out switches are cut in, passes through the magnets with sufficient force to operatively energize only one of the magnets of each car equipment, the remaining magnets of the car equipment serving as resistance elements. As each operatively energized magnet device on the car controls the switch of a normally open signal indicating circuit, when the magnet circuit is opened and the operatively energized magnet is deenergized, the switch controlling the signal circuit is automatically closed.

The same condition exists on the locomotive in that the two signal indicating devices are each controlled by an electro-magnet device. These magnet devices are connected in parallel to the normally closed train line circuit so that current supplied from a plurality of sources on the car passes through the magnets on the locomotive with only sufficient force to operatively energize only one of the magnets, the other magnet being energized, but not sufficient to be operated. The operatively energized magnet controls a valve device which is maintained closed when the magnet is operatively energized and which is maintained open when the magnet is deenergized. On the other hand, the other locomotive magnet device controls valve means which is maintained closed when the magnet is deenergized or only slightly energized and which is moved to open position when the magnet is operatively energized.

Should a break or short occur in the train line circuit, the first-mentioned locomotive magnet will be deenergized, and thus the signal device controlled thereby will be actuated. On the other hand, should the magnet circuit on one of the cars be intentionally shorted, then the current which normally passes through the magnets on the car bypasses such magnets and passes through the train line to the locomotive with sufficient force to operatively energize the above second-mentioned magnet, so that the valve device controlled by said magnet is actuated, and thus the signal device associated therewith is operated. At the same time, the deenergization of the magnets on the car effects the closing of the signal device circuit on the car. In the first instance the detector signal device on the locomotive will continue to operate until the break or short in the circuit is repaired. In the second instance the signal devices on the locomotive and on the car will be operated simultaneously until the car magnet circuit is again closed by the trainman.

Referring to the drawings, the locomotive equipment may comprise a switch device 6, a locomotive signal device 7, a short circuit detector or secondary signal device 8, a main reservoir 9, a signal shunt resistor 10, a cut-out switch 11, and a signal switch device 12.

The car equipment may comprise a trainman's switch device 13, a signal indicating device 14, an electric current supply source 15, a car signal relay 16, an emergency relay 17, a brake pipe vent valve device 18, a magnet valve device 19, and a car signal cut-out switch 20.

Extending continuously throughout the length of the train are two train line conductors 21 and 22 and also the usual brake pipe 23, said conductors and brake pipe being connected between the cars in the usual manner.

The switch device 6 is preferably operatively associated with the usual fluid pressure brake valve device (not shown) adapted to control the application and release of the brakes, said switch device comprising a drum mounted on the brake valve in the usual well known manner and provided with connected contacts 24 and 25 adapted to be engaged by contact terminals 26 and 27 respectively, when the brake valve is moved to the emergency position to effect an emergency application of the brakes. The terminal 26 is connected to a conductor 28 which in turn is connected to the train line conductor 21, while the terminal 27 is connected to a conductor 29 which is connected to the train line conductor 22.

The engine signal device 7 may comprise an electro-magnet 31 and double beat valves 32 and 33 adapted to be operated upon energization and deenergization of the magnet. The valve 32 is contained in a chamber 34, while the valve 33 is contained in a chamber 35 which is in communication with the main reservoir 9 through a pipe 36. The valves 32 and 33 are connected by means of a fluted stem 37 extending through a suitable bore 38 in the casing. Intermediate its length, the bore 38 is enlarged to provide a chamber 39, and a whistle 40 is connected to said chamber. A spring 41, contained in chamber 35, acts on the valve 33, tending to seat the same and unseat the valve 32.

The detector or secondary signal device 8 may comprise an electro-magnet 42 and a valve 43 adapted to be operated upon energization and deenergization of the magnet. The valve 43 is contained in a chamber 44 and has a stem 45 extending through a port 46 connecting chamber 44 with another chamber 47. The end of the stem 45 is enlarged and a spring 48, contained in chamber 47 acts on the valve stem, tending to unseat the valve 43. The port 46 is in communication with the fluid supply pipe 36 through a passage 49. A whistle 50 is connected to valve chamber 44 by a pipe 51.

The engineer's signal switch device 12 may comprise a casing in which is slidably mounted a plunger 52 provided with a disk-like contact member 53. The plunger 52 is adapted to be manually operated by means of a push button 55 and is normally maintained in its upper position, as shown in Fig. 2, by a spring 56. In this position the contact member 53 engages terminal contacts 57 and 58.

The terminal contact 57 is connected to one terminal of the magnet 31 of the engine signal device 7 by a conductor 59, and one terminal of the magnet 42 of the detector device 8 is connected to the conductor 59 by a conductor 60. The other terminals of the magnets 31 and 42 are connected to the conductor 21 by a conductor 61.

When the switch 11 is closed, as shown in Fig. 2, the terminal contact member 58 is connected to the conductor 22 by a conductor 62. It will thus be seen that the magnet devices 31 and 42 are connected in parallel with the train line conductors 21 and 22.

The trainman's switch device 13 on each car of the train may comprise a casing in which is slidably mounted a plunger 63 provided with a disk-like contact member 64. The plunger 63 is adapted to be manually operated by means of a push button 30 and is normally maintained in its upper position, as shown in Fig. 2, by a spring 66.

The car signal cut-out switch 20 may be of the two pole type having terminals 78 and 85 adapted to be connected by a switch arm 86 and terminals 87 and 88 adapted to be connected by a switch arm 89, the switch arms 86 and 89 being connected together so as to move in unison in the usual manner.

The source of electric current 15 may be the storage battery used for the lighting system on each car, and the positive terminal of the battery 15 is connected to a terminal contact 69 of the trainman's switch device 13, a terminal contact 70 of the car signal relay 16, one terminal of the magnet 71 of said car signal relay 16 and to a terminal contact 72 of the emergency relay 17, by a conductor 67. The conductor 67, at a point between the positive terminal of the battery 15 and the first contact terminal of the car equipment, is provided with a fuse 68.

The car signal relay 16 may comprise, in addition to the magnet 71 heretofore referred to, a plunger 73 adapted to be operated by said magnet, said plunger being provided with a contact member 74 adapted to engage the terminal contacts 70 and 75. The other terminal of the magnet 71 is connected to the terminal 87 of the car signal cut-out switch 20 by a conductor 90.

The signal indicating device 14 may be of the buzzer type and has one of its terminals connected to the terminal 78 of the car signal cut-out switch 20 by a conductor 76, and its other terminal connected to the negative terminal of the storage battery 15 by a conductor 77. The terminal 85 of the switch 20 is connected to the terminal contact 75 of the car signal relay 16 by a conductor 79. The conductor 77 is connected to the conductor 22 by a conductor 80.

The emergency relay 17 may comprise a magnet 81 and a plunger 82 adapted to be operated by said magnet. The plunger 82 is provided with a contact member 83 adapted to engage the terminal contacts 72 and 84. One terminal of the magnet 81 is connected to the switch terminal 88 by a conductor 107, while the other terminal of said magnet is connected to the conductor 21 by a conductor 108. From the foregoing it will be seen that the magnets 71 and 81 of each car equipment are connected in series in the train line circuit when the switch 20 is cut in.

The brake pipe vent valve device 18 may comprise a casing having a chamber 91 containing a piston 92 having a fluted stem 93 which is provided with a valve 94 contained in a chamber 95 connected to the brake pipe 23, said valve being adapted to seal against a seat ring 96 formed in the casing. The fluted stem 93 extends through openings in the spaced walls 97 and 98 of the casing, the space between the walls being open to the atmosphere.

The magnet valve device 19 may comprise a magnet 99, having one of its terminals connected to the conductor 22 by a conductor 100. The other terminal of said magnet is connected to the terminal contact 84 of the emergency relay 17 by a conductor 101. The device 19 also comprises a valve 102 contained in a chamber 103 which is connected to the piston chamber 91 in the vent valve device 18 by a pipe 104, said valve being operative to control communication from a chamber 105 to the chamber 103, said chamber 105 being connected to the brake pipe 23 by a pipe and passage 106. With the magnet 81 deenergized the contact member 83 is disengaged from the contact terminals 72 and 84, and hence the circuit of magnet 99 will be open and no current will pass through said magnet.

When a train composed of a locomotive and any number of cars equipped with the invention is made up, and the switch 11 on the locomotive and a switch 20 on one of the cars are closed, a closed circuit is provided in which the locomotive equipment will be energized by current supplied from the storage battery on the car.

The current will pass from the positive terminal of the storage battery 15, through the conductor 67 and fuse 68, to the magnet 71 of the car signal relay 16, operatively energizing said magnet.

From the magnet 71, the current passes through conductor 90, switch arm 89, and conductor 107 to the magnet 81 of the emergency relay 17, and from thence through conductor 108 to the train line conductor 21 and to the locomotive.

On the locomotive the current will pass from the conductor 21, through conductor 61 to the magnets 31 and 42, operatively energizing magnet 42, and from these magnets through conductor 59 to the terminal contact member 57 of the switch device 12. Since this switch is normally retained closed by the spring 56, the current will return to the negative terminal of the storage battery 15, through conductors 62, 22, 80 and 77.

Usually only the switch 20 on the rearmost car of the train need be cut in, so that the circuit will extend the length of the train. In this case the intermediate car signal equipment will be inactive and therefore the train line circuit will not be supplied with current from the storage batteries on these cars.

Since the magnets 71 and 81 on the car and the magnets 31 and 42 on the locomotive are included in the closed circuit in such a way that only the magnets 71 and 42 are operatively energized, the magnets 81 and 31 will function as resistance elements, because the amount of current passing therethrough is not sufficient to energize the same.

Therefore, the amount of current supplied from the storage battery 15 of one car may be insufficient to operatively energize the magnets 71 and 42, in view of the resistance offered by the magnets 81 and 31, and if such is the case it is necessary to increase the current flow by cutting in additional car signal switches 20 so as to obtain the current from additional storage batteries. It will be understood that if so desired, the switches 20 on all of the cars can be cut in so that each car signal equipment is included in the circuit. In this event, the signal shunt resistor 10 on the locomotive can be regulated so as to take care of the excess current supplied to the train line circuit above the amount required to only operatively energize the magnet 42 on the locomotive and the magnet 71 on each car.

With the car magnet 71 energized, the contact 74 will be maintained disengaged from the terminal contacts 70 and 75, and hence the car signal circuit will be open. Furthermore, when the magnet 81 is not operatively energized or is deenergized, the contact 83 will be maintained disengaged from the terminal contacts 72 and 84, and therefore the emergency magnet valve device circuit will be open.

With the locomotive magnet 42 operatively energized, the valve 43 will be held seated, thereby cutting off the communication through which the whistle 50 is actuated, and with the magnet 31 normally maintained not operatively energized, the valve 33 will be held seated by the spring 41, thereby cutting off the communication through which the whistle 40 is actuated.

In operation, when a trainman desires to signal the engineer, the push button 30 of the switch device 13 on a car having the switch 20 cut-in, is depressed a sufficient distance to engage the contact member 64 with the terminal contacts 69 and 112.

Since the latter is connected to the train line conductor 21 by conductor 113, the car signal relay 16 and the emergency relay 17 will be short circuited, and hence the magnet 71 will be deenergized.

With the switch device 13 closed, the current from the storage battery 15 will pass through conductor 113 to the conductor 21 and thence through conductor 61 to magnets 31 and 42, and therefore magnet 31 in addition to magnet 42, will be operatively energized, since the resistance heretofore offered by magnets 71 and 81 is now cut out.

When magnet 71 is deenergized in the above manner, the plunger 73 is operated so that contact 74 connects the contact terminals 70 and 75 and current from the positive terminal of the storage battery 15 will flow through the conductor 67 to contact terminal 70, and thence through contact 74, to contact terminal 75, and through conductor 79, switch arm 86, and conductor 76 to one terminal of the signal indicating device 14, and from the other terminal of said device, through the conductor 77 to the negative terminal of the storage battery 15, thereby causing the signal device 14 to operate.

When the magnet 31 is operatively energized in the manner heretofore explained, the valve 32 will be seated and the valve 33 unseated, thereby establishing the communication through which fluid under pressure from the reservoir 9 is permitted to flow to the whistle 40 and operate the same.

In this way the car signal device 14 and the locomotive signal device 40 will both be actuated to sound a signal initiated by a trainman, and such devices will continue to operate as long as the trainman retains the push button 30 depressed and the switch device 13 closed.

When the trainman releases the push button 30, the spring 66 returns the plunger 63 to its normal position, as shown in Fig. 2, thereby breaking the circuit through the switch device 13. Whereupon, the current will flow through the relays 16 and 17 in the manner heretofore described, so that magnet 31 will not be operatively energized, and the magnet 71 will be operatively energized, in the manner heretofore described.

With magnet 71 operatively energized, the contact 74 will be moved away from the terminal contacts 70 and 75 and the circuit through the signal device 14 will be opened. With the magnet 31 not operatively energized, the valve 33 will be seated by spring 41, thereby cutting off the communication through which fluid under pressure is supplied to the whistle 40. Therefore, both signal devices will again be inactive, as will be readily understood.

When the engineer desires to signal a trainman, the engineer depresses the push button 55 so as to disconnect the contact member 53 from the terminal contacts 57 and 58, thereby breaking the circuit through the switch device 12, and thus preventing the flow of current through the relays 16 and 17 and the magnets 31 and 42. The magnets 71 and 42 therefore will be deenergized.

The deenergization of magnet 71 effects the closing of the circuit including the signal device 14 on the cars, and the deenergization of magnet 42 permits the spring 48 to unseat valve 43 so that communication is established by which fluid under pressure from the reservoir 9 is permitted to flow to the whistle 50 and operate the same.

In this way the car signal device 14 and the locomotive whistle 50 will both be actuated to sound a signal initiated by the engineer. When the engineer releases the push button 55, the switch device 12 will be closed by spring 56, thus closing the circuit, and preventing further operation of the signal devices, as will be readily understood.

The purpose of the signal shunt resistor 10 is to limit the amount of current supplied to the magnets 31 and 42 on the locomotive, to correspond with the number of car signal switches 20 which are cut in.

For instance, if a minimum number of car signal switches 20 are cut in, then the signal shunt resistor 10 is not necessary, because only the amount of current required to operatively energize the magnet 42 will pass through the car signal relays from the car storage batteries 15, as has been described.

However, if a large number of car signal switches 20 are cut in, an excess of current would flow through the car signal relays to the train line, and therefore the magnet 31 would be operatively energized.

When a train is being made up and a relatively large number of the car signal switches 20 are cut in, the excess in current flowing through the car signal relays energizes the magnet 31. When the magnet 31 is energized, valve 32 will be seated and valve 33 unseated, thereby opening the communication through which the whistle 40 is actuated, and in order to render the whistle inactive it is necessary to reduce the amount of current passing through the magnet 31 so that said magnet will not be operatively energized.

Accordingly, should the whistle 40 sound when the train is made up, because a large number of car signal switches 20 are cut in, the arm 109 of the shunt resistor 10 can be moved to a point on the resistor to provide sufficient resistance to so reduce the current flow through the magnet 31 that said magnet will not be energized sufficiently to cause the whistle 40 to be operated.

The correct adjusted position of the arm 109 is readily determined, since the whistle 40 will become inactive when the amount of current flowing through the magnet 31 is decreased sufficiently to prevent the operative energization of said magnet and thus permit the spring 41 to move the valve 33 to its seat, thereby cutting off the communication through which fluid is supplied to the whistle 40.

When the brake valve (not shown) is operated to emergency position for effecting an emergency application of the brakes, the contact terminals 26 and 27 are brought into engagement with the contacts 24 and 25, respectively, of the switch 6, thereby shunting out the engineer's signal device 7, the detector device 8, and the signal shunt resistor 10. Cutting out the above resistances in the circuit on the locomotive increases the flow of current from the storage battery through the magnet 81 sufficiently to cause said magnet to operate the contact member 83, thus closing the circuit through the emergency relay switch device, conductor 101, magnet 99, and conductor 100, to the train line conductor 22.

With the circuit of the magnet valve device 99 thus closed the magnet 99 is energized, and this causes the valve 102 to unseat against the pressure of spring 114 contained in the valve chamber 103, thus establishing communication through which fluid under pressure in the chamber 105 supplied from the brake pipe 23, flows to the valve chamber 103 and from thence to the piston chamber 91 in the vent valve device 18.

The pressure of fluid thus supplied to the chamber 91 causes the vent valve piston 92 to move toward the right against the pressure of a spring 115 contained in chamber 95, unseating the valve 94 from the seat ring 96.

With the valve 94 unseated, fluid under pressure from the brake pipe 23 is released to the atmosphere through valve chamber 95 and around the fluted stem 93.

When each car of a train is provided with a magnet valve device 19 and a vent valve device 18, these devices throughout the length of the train, will operate simultaneously and thus cause all of the usual triple valve devices (not shown) to operate to emergency positions to effect an emergency application of the brakes substantially simultaneously on all the cars of the train.

When the detector device 8 is shunted out, in the manner above described, the magnet 42 will be deenergized, and the valve 43 will be unseated by the spring 48, thereby opening the communication through which the whistle 50 is supplied with fluid under pressure from the reservoir 9. Accordingly, this whistle will be operated so as to indicate to the engineer that the equipment is working properly.

From the foregoing it will be noted that if the train line circuit is intentionally opened, the car signal devices 14 will be caused to sound, while a short in the train line circuit will cause the whistle 50 of the detector device 8 to sound.

Firstly, when the train line circuit controlled by the switch device 13 is closed, magnet 71 is energized, and therefore the local car signal circuit is maintained open so that the signal device 14 on each car is silent. The opening of the train line circuit causes the deenergization of the magnet 71 in the manner heretofore described, and therefore the car signal circuit will close and the buzzer 14 operated.

Secondly, when the train line circuit is closed, magnet 42 of the detector device 8 is energized and hence the valve 43 will be seated, thereby cutting off the communication by which the whistle 50 is supplied with fluid under pressure from the reservoir 9. When a short occurs in the train line circuit, the magnet 42 will be deenergized, thus permitting the spring 48 to unseat the valve 43 and establish communication by which the whistle 50 is supplied with fluid under pressure from the reservoir 9.

Therefore, if there is at any time an open circuit in either train line conductor, the car signals 14 to the rear of the break which are cut in will sound continuously until the break is repaired. If no car signals are cut in between the break and the locomotive, the whistle 50 on the locomotive will sound continuously. Furthermore, with the car signal cut in and the car signal switch closed, if the car signal does not sound it indicates that the fuse 68 is open.

When two or more locomotives are coupled to the front of the train, the switch 11 on all but the front locomotive can be opened so as to shunt out the signalling equipment on the other locomotives. With the other locomotive signalling equipment thus shunted out, the apparatus will function in the manner hereinbefore described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A signal system for a train comprising a locomotive and a plurality of cars, said signal system comprising a normally closed train circuit including a source of current and train wires connected in series with said source of current and also comprising a normally open circuit on each car including said source of current, a signal indicating device and a switch contact member operative to one position to close the car circuit through said source of current and said signal indicating device and operative to another position to open the car circuit, means responsive to the normal flow of current through the normally closed circuit for maintaining said switch contact member in circuit open position and operative to close the normally open circuit either upon a decrease in the flow of current through the normally closed circuit or upon the opening of the closed circuit, a signal indicating device on the locomotive, means responsive to the flow of current through said normally closed circuit for maintaining the locomotive signal indicating device inoperative and operative upon the opening of said normally closed circuit to effect the operation of said locomotive signal indicating device to indicate a signal, another locomotive signal indicating device, means normally maintaining said other locomotive signal indicating device inoperative to effect a signal and responsive to an increase in the flow of current in the normally closed circuit over that normally flowing in the circuit for effecting the operation of said other locomotive signal indicating device to indicate a signal, a switch device on each car operative to short circuit the source of current around the local car signal controlling means for increasing the current flow through the closed circuit for causing said other locomotive signal controlling means to operate to effect the operation of the second mentioned locomotive signal device to indicate a signal and for decreasing the flow of current through the local car switch controlling means to cause the means to operate to move the local switch contact member to close the local car circuit through said source of current and local car signal indicating device, and a switch on the locomotive operative to open and close said normally closed circuit.

2. A signal system for a train composed of a locomotive and a plurality of cars, said signal system comprising a normally closed circuit including a source of current and train wires connected in series with said source of current and also comprising a normally open circuit on each car including said source of current, a signal indicating device and a switch contact member operative to one position to close the circuit through said source of current and said signal indicating device and operative to another position to open the circuit through said source of current and signal indicating device, a magnet device for controlling the operation of said switch contact member, said magnet device comprising an armature carrying said switch contact member and a winding included in said normally closed circuit energized by current flowing therethrough for attracting said armature to maintain said switch contact member in circuit open position, said armature being operative to move said switch contact member into circuit closing position, a signal indicating device on the locomotive, a magnet device on the locomotive comprising an armature operative to control the operation of the locomotive signal indicating device and also comprising a winding included in said normally closed circuit energized by current flowing therethrough for attracting its armature to maintain said locomotive signal indicating device inoperative, a second signal indicating device on the locomotive, a second magnet device on the locomotive comprising an armature operative to control the operation of said second signal indicating device and also comprising a winding included in said normally closed circuit and connected in parallel with the winding of the first mentioned locomotive magnet device, the armature of the second locomotive magnet device being unattracted by the energization of its winding when the windings of the car magnet devices and the winding of the first mentioned locomotive magnet device are energized and normally maintaining the second locomotive signal indicating device inoperative and being adapted to be attracted upon the short circuiting of the source of current around the winding of one of the car magnets, and a switch device on each car operative to short circuit the source of current around the local magnet winding to increase the flow of current through the winding of the second mentioned locomotive magnet device and to decrease the flow of current through the winding of the local car magnet device.

3. A signal system for a train comprising a locomotive and a plurality of cars, said signal system comprising a normally closed train circuit including a source of current and train wires connected in series with said source of current and also comprising a normally open circuit on each car including said source of current, a signal indicating device and a switch contact member operative to one position to close the car circuit through said source of current and said signal indicating device and operative to another position to open the car circuit, means responsive to the normal flow of current through the normally closed circuit for maintaining said switch contact member in circuit open position and operative to close the normally open circuit either upon a decrease in the flow of current through the normally closed circuit or upon the opening of the closed circuit, a signal indicating device on the locomotive, means responsive to the flow of current through said normally closed circuit for maintaining the locomotive signal indicating device inoperative and operative upon the opening of said normally closed circuit to effect the operation of said locomotive signal indicating device to indicate a signal, another locomotive signal indicating device, means normally maintaining said other locomotive signal indicating device inoperative to effect a signal and responsive to an increase in the flow of current in the normally closed circuit over that normally flowing in the circuit for effecting the operation of said other locomotive signal indicating device to indicate a signal, a switch device on each car operative to short circuit the source of current around the local car signal controlling means for increasing the current flow through the closed circuit for causing said other locomotive signal controlling means to operate to effect the operation of the second mentioned locomotive signal device to indicate a signal and for decreasing the flow of current through the local car switch controlling means to cause the means to operate to move the local switch contact member to close the local car circuit through said source of current and local car signal indicating device, a switch on the locomotive operative to open and close said normally closed circuit, and a variable resistance device interposed in said normally closed circuit operative to regulate the flow of current through the locomotive signal controlling means.

4. In a signal system for a train comprising a locomotive and a plurality of cars, the combination with two train wires, of a source of current on each of said cars having one terminal connected to one of said train wires, a signal indicating device on each car, a switch device on each car operative to control the opening and closing of a circuit through the local signal indicating device and local source of current, a switch device on each car operative to one position to close a circuit through the local source of current, train wires and locomotive switch device and to connect the local signal indicating device in series with the local switch device, a magnet device on each car responsive to the normal flow of current through the circuit closed locally for maintaining the circuit open through the local source of current and local signal indicating device to maintain the local signal indicating device inoperative to indicate a signal and operative upon a decrease in the flow of current through the closed circuit to close the circuit through the local source of current and local signal indicating device to cause the local signal indicating device to indicate a signal, a signal indicating device on the locomotive, a magnet device on the locomotive responsive to the flow of current through the first mentioned closed circuit for maintaining the locomotive signal indicating device inoperative to indicate a signal and operative upon a decrease in the flow of current for causing the locomotive signal indicating device to operate to indicate a signal, a second locomotive signal indicating device, a second magnet device on the locomotive for controlling the operation of the second locomotive signal indicating device, said second magnet device normally maintaining the second locomotive signal device inoperative to indicate a signal and being responsive to a higher than normal flow of current through the first mentioned closed circuit to cause the second locomotive signal indicating device to operate to indicate a signal, and a switch device on each car operative to short circuit the local source of current around the local car magnet device cut in the first mentioned closed circuit to increase the flow of current through the second locomotive magnet device to cause the device to operate to effect the operation of the second locomotive signal indicating device to indicate a signal and to decrease the flow of current through the local car magnet device to cause the device to operate to close the circuit through the local source of current and local car signal indicating device.

JOSEPH C. McCUNE.